CLEANING ALUMINUM
Original Filed Nov. 4, 1953
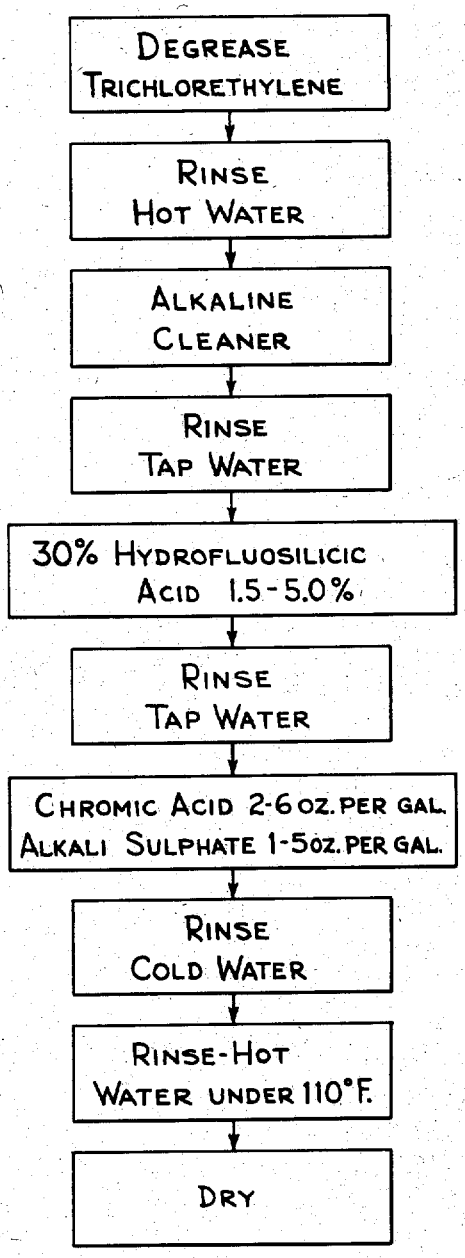
INVENTOR.
LEON L. DEER
BY G. O. O'Brien
T. L. Styner ATTYS.

United States Patent Office

Re. 24,596
Reissued Jan. 27, 1959

24,596

CLEANING ALUMINUM

Leon L. Deer, Marion County, Ind., assignor to The Diversey Corporation, a corporation of Illinois Original No. 2,705,500, dated April 5, 1955, Serial No. 390,266, November 4, 1953. Application for reissue March 29, 1957, Serial No. 649,586

13 Claims. (Cl. 134—3)

(Granted under Title 35, U. S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States of America for governmental purposes without the payment of any royalties thereon or therefor.

My invention relates to aluminum cleaning and is particularly directed to the process of substantially freeing the surface of aluminum parts of all films having electrical resistance. The cleaning of the surfaces of aluminum parts to be joined by welding, or to be thereafter covered with precisely measured protective coatings are the subject of my cleaning process. "Aluminum" is used here to designate the substantially pure metal, the commerical metal with the usual traces of impurities, and the metal with measured alloying constituents, all in the rolled, case, or wrought form.

Pure aluminum has such an affinity for oxygen that it appears to instantaneously oxidize when exposed to air, even at room temperature. Because of this property, welding is usually carried out in an inert or reducing atmosphere, or by the percussion method where a current of hundreds of amperes is made to flow for a few micro seconds across the interface of the parts to be joined in an attempt to obtain fusion before oxidation. The theory of instantaneous formation of an oxide film is believed now to be only partially true; the film heretofore thought to be formed in situ actually being a residue left by the so-called cleaning solution. Although caustic soda and various acids may be made strong enough to dissolve the aluminum oxide, $Al_2O_3$, new compounds of high electrical resistance appear to be formed and left on the aluminum surface. Worse, such cleaning solutions attack the base metal and etch and pit the surface which still further increases the average electric resistance laterally through the surface.

Aluminum parts which are tumbled in granite grit are particularly difficult to clean. After much experimentation, it was found that the film deposited during tumbling could not be removed by the usual deoxidizers and that the parts must first be acid bathed. For example; some success was had when a low silica alloy was immersed in an aqueous bath containing two to four ounces of chromic acid and 100 cc. of sulphuric acid per gallon followed by immersion in a deoxidizer. That is; some improvement in welding such metals was noted but the welding results were far from uniform, and the process was costly in time, 20 to 25 minutes being required for the acid and deoxidizing baths and the various hot and cold water rinses.

The problem of freeing the surface of aluminum parts of oxide and other films is still further complicated by size tolerances. Where the thickness of a machined or prefabricated sheet aluminum part must not be reduced more than, say, .0001 inch, strong acid or caustics cannot be indiscriminately applied to the aluminum.

Dissolution of the surface film and the undrelying base metal and contamination of the baths presented still another problem. The cleaning bath will deteriorate and become less effective as the quantity of aluminum compounds in solution increases. Since the effectiveness of any one cleaning bath varies from batch to batch, the operator cannot estimate the time of immersion. Loss of control at this point means either excessive loss of base metal or incomplete film removal.

The object of my invention is an improved process of cleaning aluminum parts.

A more specific object of my invention is a process of sufficiently removing foreign substances and films from the surface of aluminum parts to substantially reduce the electrical resistance through the surface to near zero, while at the same time not removing excessive amounts of the base metal of the parts.

Another object of my invention is an improved process of cleaning aluminum parts which process can be accurately predetremined or controlled as to the time and temperature factors of the various baths.

Other objects of my invention will become apparent to those skilled in the art in the following description of exemplary embodiments of the invention. While the invention is specifically defined in the appended claims, the embodiments are depicted in the accompanying drawing in the single figure showing a flow diagram of the principal steps of the cleaning process involving my invention.

To better understand the degree of cleanliness that may be expected of my novel cleaning process, it would be advantageous to understand one technique of measuring cleanliness. The technique found to be simple, accurate, and reliable comprises pressing together under considerable pressure two flat faces of specimen sheets to be tested and then measuring of electrical resistance between the anvil and plunger of the press. By standardizing the area of the anvil and plunger and the pressure therebetween, and by electrically compensating for the resistance at the faces of the anvil and plunger, the electrical resistance between the contacting surfaces of the specimen is measured in micro ohms. An aluminum piece with a surface having 100 to 300 micro ohms resistance will not uniformly weld. Innumerable aluminum specimens cleaned according to my invention had resistance in or near the 0 to 25 micro ohm range. Tests show conclusively that there is a direct correlation between these resistance readings and shear strength, nugget size and symmetry of the resultant weld. Cleanliness as indicated by such resistance measurements also has a direct bearing on the uniformity of any anodized coating that may be applied to the aluminum, and on the rate of build-up of the coating.

Control of the cleaning solution concentrations, time of immersion, and temperatures of baths to practice my invention is much simplified if the aluminum parts are initially free of rolling mill greases, dirt, mold sands, paint, et cetera, before the oxide removal starts. Preliminary cleaning may be done by washing in a trichlorethylene wash followed by a hot water rinse and then by a caustic bath. Immersing for two to five minutes in an alkaline solution containing 18 to 20 grams of active sodium oxide per liter of tap water, followed by cold water rinsing, is found effective. Air or other mechanical agitation should be used. With this or other degreasing solutions, care should be exercised to not over etch the base metal, consideration being given to the solubility of various metallic constituents that may be alloyed with the aluminum. Further, care should be taken to use the active sodium oxide solutions or other cleaners without silicates, phosphates, borates, aluminates, soaps, or cationic wetting agents which may leave a deposit. Undoubtedly, there are anionic or ionic wetting agents which could be used satisfactorily.

The actual oxide removal now requires two distinct acid baths and two rinses; one bath and one rinse being critically controlled as to temperature. Complete removal of the oxide without measurable removal of the base metal and without criticality as to time of immersion makes by process particularly easy in the hands of unskilled labor.

The first step of my process, after degreasing, comprises immersing the aluminum parts in a fluorine-containing acid bath, the concentration of the acid being less than that which will rapidly dissolve the base metal. Concentration, however, is not critical because a self protecting film composed apparently of the products of decomposition of the acid and $Al_2O_3$ reaction forms in situ and substantially terminates the reaction at the metallic surface of the base piece. This film is possibly similar in composition to the coating left by the hydrofluosilicic acid treatment of aluminum disclosed in the United States Patent No. 2,213,263. The particular fluorine-containing acid bath found to be effective in the first bath of my invention is also hydrofluosilicic acid in water and the amount preferred is in or near the range of 1.5 to 5 percent, by volume of 30 percent hydrofluosilicic acid. Tap water at room temperature may be used and the time of immersion for all commercial grades of aluminum and aluminum alloys is two to eight minutes depending on the loss of the non-aluminum constituents into solution. Air bubble agitation is convenient and probably contributes to the uniform treatment of irregular shaped pieces. The evolution of hydrogen appears to wash the surface of contaminants. The concentration of the acid will approximately govern the time of immersion, but as suggested, total reaction is more or less automatically limited. The color of a film, if any, left on the aluminum piece is indicative of the alloying constituents of the aluminum. For example; amorphous silicon is brown, while copper leaves a black smutty film.

Rinsing in cold tap water follows the hydrofluosilicic acid bath.

The next step in my novel process comprises immersing the aluminum piece in an aqueous alkali-chromic acid bath. The chromic radial, $CrO_3$, or chromate, $CrO_4$, or dichromate, $Cr_2O_7$, is combined in dilute aqueous solution with sodium or potassium, and with the acid radial, by adding to the water bath chromic acid and an alkali sulphate, $Na_2SO_4$, or an alkali acid sulphate, $NaHSO_4$. Good results have been obtained in cleaning aluminum pieces comprising commercially pure aluminum metal such as type 2S as well as the commercially obtainable aluminum alloys such as 6IS containing small amounts of copper, silicon, magnesium and chromium, by adding 2 to 6 ounces of dry chromic acid per gallon of tap water and adding 1 to 5 ounces of dry sodium sulphate per gallon of tap water. The pH reading of the bath should be maintained during operation between 1.2 and 1.5. The temperature of this particular alkali-chromic acid bath should be held between 185 and 195 degrees Fahrenheit when the concentrations mentioned are employed. The time of immersion is not critical, 5 to 8 minutes producing good results. Several minutes are required to remove any smut that may have been left by the hydrofluosilicic acid bath and to deposit the chromate type film which apparently protects the aluminum piece from reoxidation and assures low resistance and good welding properties for several days after treatment. If the specimen is left in the chromic bath for longer periods of time, there is undoubtedly lost some of the base metal into solution.

The alkali-chromic bath may comprise sodium dichromate, $Na_2Cr_2O_7$, and sulphuric acid, $H_2SO_4$, if desired. To maintain the pH of the bath in this 1.2 to 1.5 range, however, less added sulphuric acid is required. It is to be remembered that the free or dissociated sulphuric acid, $H_2SO_4$, content of aqueous sodium acid sulphate, $NaHSO_4$, is less than when an equivalent amount of the sulphuric acid is added, and hence for the same chemical activity it is not necessary to heat the sodium dichromate-sulphuric acid prepared bath to the 185–195 degree range.

While the sodium salts is preferred, potassium salts may be used. Further, the nitrates of these alkalis appear, in extensive tests, to produce the same results as the sulphates.

It is believed the film on the metal contains mostly trivalent and hexavalent chroimum complexes. The thin films probably contain mostly trivalent chromium, since hexavalent chromium is rather soluble in aqueous solutions. The film protects the aluminum metal from rapid reoxidizing which would produce layers of high electrical resistance. The chromates probably displaced other ions which offer electrical resistance. The chromates do not offer such high resistance, consistent 5 to 10 micro ohm readings being obtained.

A final and important step in my process, which is found by experience to preserve the cleaned aluminum in room air and retain the low resistance readings, comprises rinsing the chromic acid treated parts in hot tap water. This hot water rinse must not be over 110 degrees Fahrenheit. If this final rinse is above about 110 degrees Fahrenheit, the resistance readings increase sharply. Apparently, a rinse at a temperature higher than 110 degrees Fahrenheit deposits carbonates or other high resistant films on the aluminum from the tap water.

While the described aluminum cleaning process consistently yields resistance reading less than 15 micro ohms, the stock removal is usually no more than .00005 inch in thickness as determined by weighing before and after, and seldom as much as .0001 inch. The tensile strength of a spot weld .5 inch in diameter between pairs of aluminum coupons each .125 inch thick averages over 3,320 pounds; the lowest test among several hundred specimens being over 3,000 pounds. The specimens cleaned according to my invention, welded and tensile tested including aluminum sheets of the 52S H34 type which had been ball milled, or "roto-burred" with red granite grit or with aluminum oxide pebbles, or had been belt sanded, "Lea" finished, or vapor blasted with 220 grit. Nine specimens that were cleaned according to my invention, without the preliminary caustic degreasing, when welded had tensile strengths of 2,900 to 3,100 pounds.

I do not know why the specific process described preserves the aluminum pieces, but it is my belief that the chromic acid bath leaves a very thin aluminum chromate film on the surface which, although not visible under a microscope, prevents reoxidation and yet does not offer a measurable increase in electrical resistance. It has been found that in any case, aluminum parts cleaned according to my invention can stand in air for five days or more without noticeable increase in resistance, nor reduced weld strength.

In the art of powdered metallurgy, it becomes desirable occasionally to employ aluminum powder of relatively small screen sizes and free of the oxide in the mixtures to be die pressed and sintered. The successive steps of my novel aluminum cleaning process can be employed to clean aluminum powder by employing suitable containers for the powder for immersion in the baths and rinses. Mechanical agitation is necessary for uniform action of the acids throughout the mass of the aluminum powder.

Other modifications may be made by those skilled in this art without departing from the spirit of my invention. For example; the 1.5 to 5 percent hydrofluosilicic acid bath may be replaced with 1.5 to 3 percent fluoboric acid combined with 1 ounce per gallon boris acid. Also, the hydrofluosilicic acid may be replaced with about 15 percent sulphuric acid and 10 percent nitric acid when heated to 160 to 180 degrees Fahrenheit.

I claim:

1. The process of removing surface oxides from aluminum having alloying constituents, said process comprising combining the oxide with a fluorine-containing solution to produce a film of fluoride salts of the base metal on aluminum, rinsing in water, and then immersing in an aqueous bath containing a chromic acid and an alkali sulphate.

2. The process of removing surface oxides from an aluminum body comprising first cleaning the superficial dirt and grease from said body, then immersing said body in a 2 to 5 percent water solution of hydrofluosilicic acid, rinsing said body in water at room temperature, then immersing said body in a water solution, held between 185 and 195 degrees Fahrenheit, of chromic acid and an alkali sulphate with a pH between 1.2 and 1.5, and finally rinsing in hot water not over 110 degrees Fahrenheit.

3. The process of cleaning an aluminum piece comprising immersing said piece in a water solution containing between 3 and 25 percent by volume at least one of the compounds included in the group consisting of a hydrofluosilicic acid, a fluosilicate, fluoboric acid, a fluoborate, and sulfuric acid with nitric acid; rinsing the piece in tap water; then immersing said piece in a dilute chromic acid containing a catalyzing agent selected from the group consisting of sodium sulfate, potassium sulfate, magnesium sulfate, sodium nitrate and potassium nitrate; and finally rinsing in hot water not over 110 degrees Fahrenheit.

4. The method of cleaning a piece of aluminum or aluminum base alloy comprising successively immersing said piece in a solution which produces sodium oxide, a fluosilicic acid bath, and a chromic acid bath containing an alkali sulphate; and rinsing said piece in water after each of the mentioned immersions.

5. The method of preparing an aluminum piece for welding comprising preliminarily cleaning said piece, then deoxidizing the surface of said piece, rinsing in cold water, and finally applying to the deoxidized surface an aqueous solution containing a chromium compound which will remove the deoxidized products from said surface, said aqueous solution containing a compound selected from the group consisting of alkali metal sulphates, alkaline earth metal sulphates, alkali metal nitrates and sulphuric acid, and rinsing said piece in hot water.

6. The process of reducing the surface electrical resistance of a metal alloy predominately aluminum comprising applying to said surface a solution containing a substance selected from the group consisting of fluorine-containing compounds, and sulfuric acid with nitric acid, which solution will combine with and reduce in situ the oxides of aluminum, and then applying to said surface an aqueous solution containing compounds of the group consisting of chromic acids and salts of chromic acid, and at least one salt of the group consisting of sulphates and nitrates of sodium, potassium and magnesium.

7. The method of reducing to substantially zero the electrical resistance of the surface of aluminum and aluminum alloys comprising the steps of applying a hydrofluosilicic acid to said surface, rinsing in tap water, and then applying to said surface an aqueous solution containing 2 to 6 ounces of chromic acid per gallon and 1 to 5 ounces of an alkali sulphate per gallon.

*8. The method of treating an aluminum surface to simultaneously deoxidize it and protect it against reoxidation without measurably increasing electrical resistance, which comprises treating the surface of an aluminum piece with an aqueous solution having a pH of 1.2 to 1.5 and containing a member of the group consisting of chromic acid, alkali metal chromates and alkali metal bichromates, and a member of the group consisting of sulfuric acid, nitric acid, alkali metal sudfates, alkaline earth metal sulfates, alkaline earth metal nitrates and alkali metal nitrates, and rinsing the aluminum piece so treated with water.*

*9. The method of treating an aluminum surface to simultaneously deoxidize it and protect it against reoxidation without measurably increasing electrical resistance, which comprises treating the surface of an aluminum piece with an aqueous solution having a pH of 1.2 to 1.5 and containing chromic acid and an alkali metal sulfate and rinsing the aluminum piece so treated with water.*

*10. The method of treating an aluminum surface to simultaneously deoxidize it and protect it against reoxidation without measurably increasing electrical resistance, which comprises treating the surface of an aluminum piece with an aqueous solution having a pH of 1.2 to 1.5 and containing chromic acid and an alkali metal nitrate and rinsing the aluminum piece so treated with water.*

*11. The method of treating an aluminum surface to simultaneously deoxidize it and protect it against rtoxidation without measurably increasing electrical resistance, which comprises treating the surface of an aluminum piece with an aqueous solution at a pH of 1.2 to 1.5 containing an alkali metal bichromate and sulfuric acid and rinsing the aluminum piece so treated with water.*

*12. The method of treating an aluminum surface to simultaneously deoxide it and protect it against reoxidation without measurably increasing electrical resistance, which comprises treating the surface of an aluminum piece with an aqueous solution at a pH of 1.2 to 1.5 containing an alkali metal chromate and sulfuric acid and rinsing the aluminum piece so treated with water.*

*13. The method of treating an aluminum surface to simultaneously deoxidize it and protect it against reoxidation without measurably increasing electrical resistance, which comprises treating the surface of an aluminum piece with an aqueous solution at a pH of 1.2 to 1.5 containing chromic acid, sulfuric acid and an alkali metal sulfate and rinsing the aluminum piece so treated with water.*

References Cited in the file of this patent or the original patent

UNITED STATES PATENTS

| | | |
|---|---|---|
| 795,216 | Forster | July 18, 1905 |
| 1,952,417 | Chandler | Mar. 27, 1934 |
| 2,137,988 | Hempel | Nov. 22, 1938 |
| 2,365,153 | Stevens | Dec. 19, 1944 |
| 2,647,865 | Freud | Aug. 4, 1953 |
| 2,650,156 | Jones | Aug. 25, 1953 |